United States Patent [19]

Futrell, II

[11] Patent Number: 4,773,612

[45] Date of Patent: Sep. 27, 1988

[54] WADING TAGLINE REEL

[75] Inventor: James C. Futrell, II, Picayune, Miss.

[73] Assignee: The United States of America as represented by the Secretary of the Interior, Washington, D.C.

[21] Appl. No.: 107,835

[22] Filed: Oct. 13, 1987

[51] Int. Cl.$^4$ .................. D65H 23/06; G01B 3/10
[52] U.S. Cl. .................... 242/99; 242/84.8; 242/106; 33/137 R
[58] Field of Search .............. 242/84.8, 99, 96, 100, 242/106; 33/137 R, 138

[56] References Cited

U.S. PATENT DOCUMENTS

| | | | |
|---|---|---|---|
| 2,236,305 | 3/1941 | Ahlin | 242/100 |
| 2,335,105 | 11/1943 | Browning | 33/138 |
| 2,515,430 | 7/1950 | Tomala | 242/99 |
| 3,273,820 | 9/1966 | Quenot | 242/84.8 |
| 3,662,969 | 5/1972 | King | 242/84.8 |
| 4,141,146 | 2/1979 | Broom | 33/137 R |
| 4,215,828 | 8/1980 | Rathbun et al. | 242/99 X |
| 4,663,854 | 5/1987 | Miller et al. | 33/138 |

Primary Examiner—Stuart S. Levy
Assistant Examiner—Steven M. duBois
Attorney, Agent, or Firm—E. Philip Koltos

[57] ABSTRACT

A lightweight plastic reel for retaining and dispensing tagline used in the measurement of small wadable streams and rivers is disclosed which comprises an outer plastic casing, a hollow plastic handle connected to the casing capable of receiving a support rod used in stationing the reel on the bank of a river, an inner plastic spool having spool locking means, a central shaft, and a simplified drag assembly comprised primarily of two metal plates which when brought together provide a braking action on the rotation of the spool. The drag assembly of the reel is constructed so as to be virtually maintenance-free, and, unlike prior art reels, will not foul up when it encounters mud, dirt, grit or other conditions normally encountered in stream measurements.

7 Claims, 2 Drawing Sheets

WADING TAGLINE REEL

FIELD OF THE INVENTION

The invention relates to a plastic reel for retaining and dispensing tagline used in stream width measurements which has a hollow handle and tensioning means.

BACKGROUND OF THE INVENTION

In the scientific study of small wadable streams and rivers, it is desirable to take accurate readings of the various hydrological characteristics of the stream, particularly river flow. In a flowing river which is not too deep to wade, flow determination can be conveniently accomplished by stretching a tagline across the river to determine width, using a wading rod to measure depth, and employing a current meter to measure flow velocity. The total river flow can then be determined by the equation $Q=AV$, where Q is the total river discharge, A=area of river cross-section, and V=velocity. By measuring stream width with a tagline, and depth with a wading rod, the cross-sectional area of a river can be determined by a wading hydrographer.

At present, hydrographers who wish to use the tagline method do not have a great variety of tagline reels to choose from in carrying out stream width measurements. The most commonly used reel to use with a tagline is the Pakron reel (as disclosed in Buchanan et al., "Discharge Measurements at Gaging Stations, U.S. Geological Survey, 1969, pp. 17–21), which is no longer being manufactured. Unfortunately, the Pakron reel suffers from various shortcomings. First of all, the reel is made entirely of metal, and has a drag assembly which is extremely complex, being composed of many "swiss watch" type small gears and other moving parts. These features make the Pakron reel bulky, expensive, and very susceptible to drag assembly failure with minimal exposure to the elements. Often, a small amount of mud or muddy water is all that is necessary to foul up the drag assembly, and these problems cannot be easily overcome by rinsing the assembly. In addition, the Pakron reel has a small reel capacity (only about 300 feet) and a lock-down or stationing device at one end which cannot be used as a handle. To overcome the shortcomings of this and other prior art tagline reels, it is desirable to obtain a reel which is lightweight, inexpensive and simple to use, which has a maintenance free drag assembly not prone to fouling up under normal conditions, which has a stationing device that can double as a handle for the reel, and which has an enlarged spool capacity.

SUMMARY OF THE INVENTION

In accordance with the present invention, there is provided a lightweight molded plastic reel for use with a tagline used in the width measurements of small streams and rivers which comprises an outer plastic casing, an inner plastic spool rotated by a central plastic shaft connected to a crank, a hollow plastic handle through which a support rod can be placed in order to station the reel on the bank of the river, and a simplified drag assembly comprising a stationary plate attached to the outer casing, and a rotatable plate attached to the central shaft, the two plates being pressed together by screw means in order to gradually increase the tension against rotation of the spool. The reel of the present invention is lighter, has a greater spool capacity, and is less expensive than prior art versions, yet is also durable and maintenance free under conditions normally encountered by a hydrographer. Normal operation of this reel is not impaired by mud or muddy water, and the hydrographer can merely rinse the reel off and continue taking stream width measurements without the drag assembly fouling up.

Some of the features of the present invention have been observed in prior art reels disclosed in the patent literature. However, the references do not disclose all of the features present in applicant's tagline reel. For instance, U.S. Pat. Nos. 3,423,044 (Beiderwell) and 3,830,443 (Quenot) disclose reels which include a finger-gripped handle connected to the reel, but these handles are not hollow as in the present invention, and thus not designed to station the reel on the ground. U.S. Pat. No. 4,442,983 (Moll) discloses an adjustable brake for a reel consisting of a sliding blade which is pressed against notches in the side of the reel drum. This brake mechanism is clearly different than the drag assembly of the present invention, and has a different mode of operation, as observed, for example, in the radial movement of the sliding blade, a feature not found in the present invention. Finally, U.S. Pat. No. 3,241,788 (Visockis) discloses a fishing reel made of plastic parts, and U.S. Pat. No. 3,592,406 (Martin et al.) discloses a steel reel having a polyurethane coating. Neither of these latter patents discloses a tagline reel for stream measurements made out of a polycarbonate plastic, as disclosed in the present invention. Applicant's invention comprises an advance in the field of wading tagline reels, and has features not observed in the prior art.

DETAILED DESCRIPTION OF THE PREFERRED EMBODIMENTS

Figure 1:
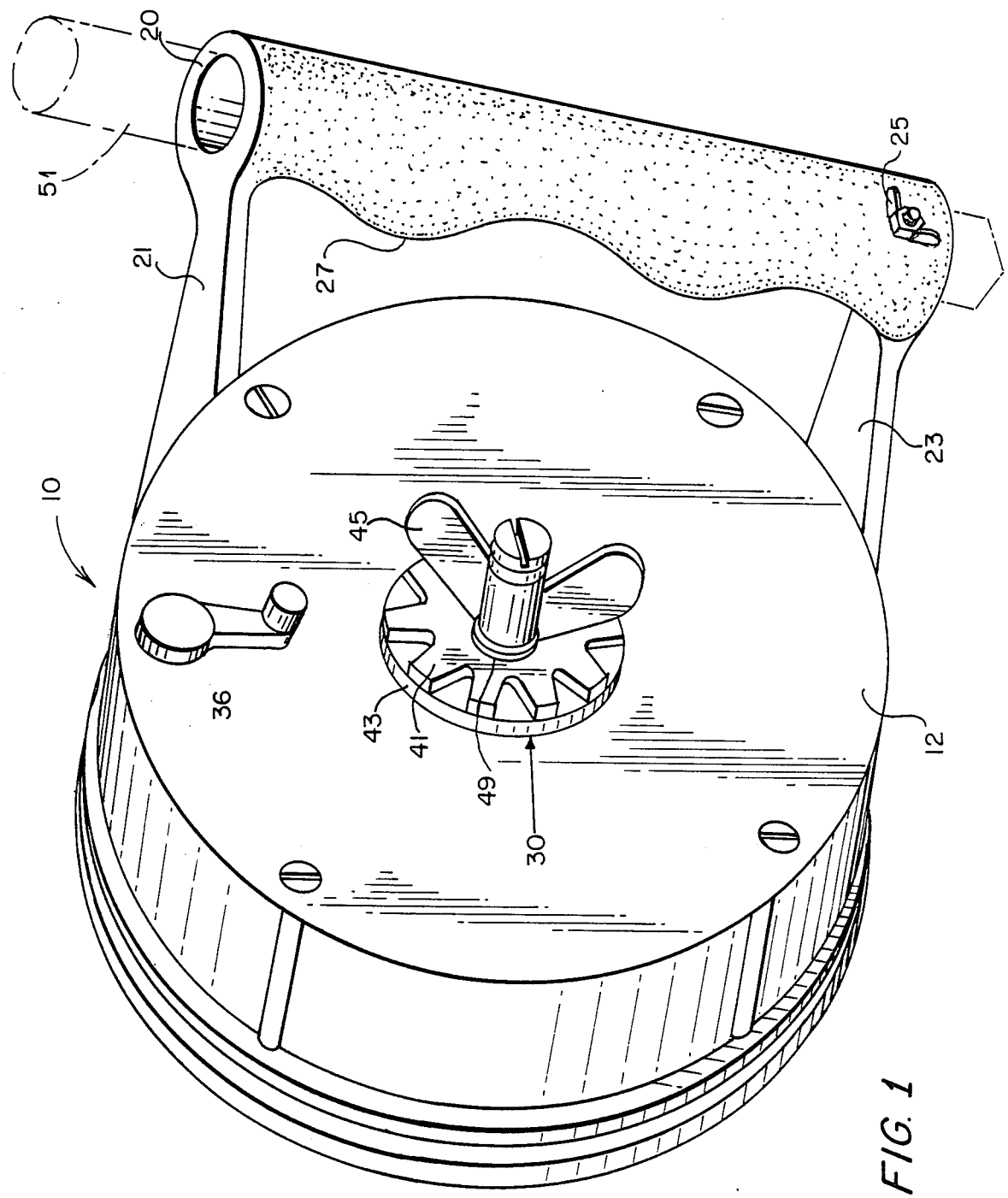
FIG. 1 is a perspective view of the reel of the present invention.
Figure 2:
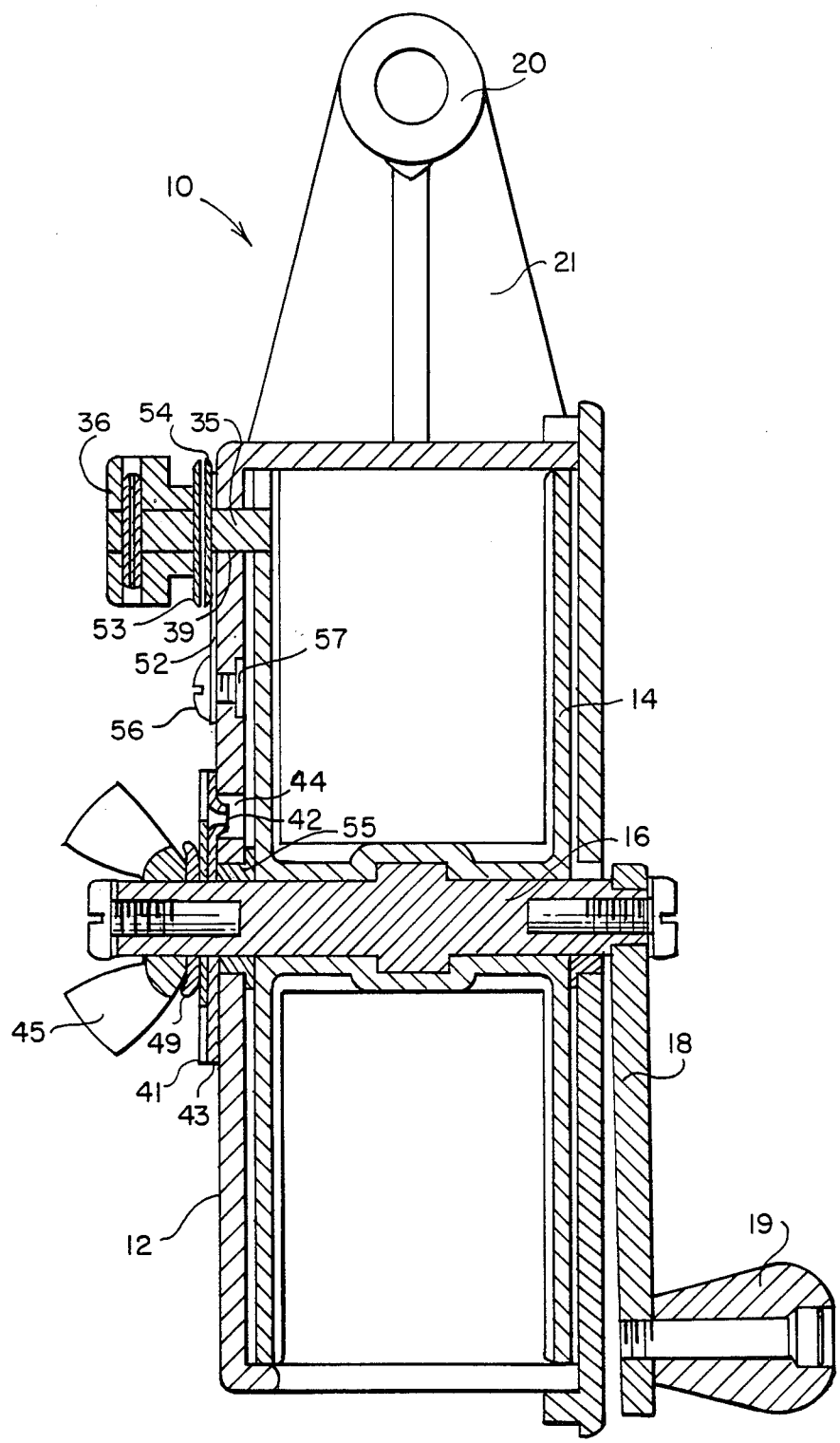
FIG. 2 is a top cut-away view of the reel of the present invention.

The reel 10 of the present invention, designed for retaining and dispensing tagline, and depicted in FIGS. 1 and 2, is comprised of outer casing 12, inner plastic spool 14 capable of receiving tagline and connected to central plastic shaft 16, which has crank means 18 and crank handle 19, a hollow plastic handle 20 connected to the outer casing 12 by projections 21 and 23 and including support rod securing means, preferably wing nut 25, and a drag assembly, shown generally at 30. The plastic handle 20 not only has a finger grip 27 so that a hydrographer can use it conveniently to transport the reel, but in addition is hollowed out so that it can retain a support rod or other stationing means (not shown) which can be used to station the reel on the bank of a stream. When a hydrographer wishes to use the tagline to make a stream width measurement, he or she will position the reel 10 on the bank of the stream, and place a support rod through hollow handle 20 and into the stream bank. The support rod may be adjusted to any desired depth in the bank, depending on the consistency of the bank soil, and is secured by tightening wing nut 25 which secures a notched bolt (not shown) around the support rod. Once the reel is firmly positioned in this manner, the tagline can be pulled out from the reel, and a stream measurement can be taken.

The inner spool 14 of the reel of the present invention, as observed in FIG. 2, is designed to receive at least around 600 feet of tagline, a capacity roughly double that of the previous Pakron reel. The inner spool 14, disposed inside outer casing 12, is rotatable and is connected to central plastic shaft 16 which has crank means 18 and crank handle 19. Rotating the central shaft 16 by turning handle 19 of crank means 18 will rotate the spool in a desired direction. In one direction, the spool will rotate to unwind and dispense the tagline outward for use by the hydrographer; turning the crank means in the reverse direction will wind up the tagline after the stream measurement has been made.

The inner spool 14 also contains spool locking means 36 which is capable of preventing the spool from rotating when so desired. The spool locking means comprises a pin 35 which fits into a hole 39 in casing 12 and in a corresponding hole 37 in the spool 14 in order to retard rotation of the spool entirely. The spool contains at least one locking pin hole, and preferably a plurality of holes is provided around the spool so that the rotation can be prevented at virtually any position the spool is in. When it is desired to stop the spool, the pin is actuated by turning pin handle 33 which forces pin 35 into the holes 39 and 37 in the casing and the spool, respectively. When the handle is turned back to its original position, locking pin 35 recedes from the hole 37 in the spool 14, and allows the spool freedom of movement once again.

The reel of the present invention also includes simplified drag assembly 30 for improved and maintenance-free tensioning of the reel rotation. Drag assembly 30 is situated at one end of central shaft 16, which runs through both outer casing 12 and inner spool 14. The drag assembly is situated at one end of the shaft outside of the outer casing, while the other end of the shaft is occupied by crank means 18. The drag assembly 30, as observed in both FIGS. 1 and 2, is comprised primarily of an outer metal plate 41, preferably a notched brass washer, and an inner metal plate 43, preferably a washer composed of stainless steel. The outer plate 41 is connected to shaft 16 so that it rotates when the shaft is rotated. The inner plate 43 has a dimple 42 which fits into notch 44 on outer casing 12 and connects the inner plate to the non-rotating casing. As a result, inner plate 43 will normally be kept stationary, and will not move when the shaft is rotated. When the two plates 41 and 43 are pushed together, such as by screw means, preferably wing nut 45, tension against rotation of the spool is applied, and this tension or braking force will increase as the plates are brought more tightly together. Thus, a gradual or variable amount tension can be applied against the rotation of the inner spool 14 of the reel by means of wing nut 45 as it is tightened onto plates 41 and 43. Preferably, a curved washer 49 is placed between wing nut 45 and outer plate 41.

The drag assembly thus can be used if one wishes to apply gradual tension to the tagline being dispensed from the reel, or if a specific tension is desired which does not completely prevent rotation of the inner spool. As mentioned above, this drag assembly is an improvement over the prior art Pakron reel drag assembly in that it is virtually maintenance free, and will not foul up when dunked in mud or muddy water as might normally occur during a stream measurement.

The main pieces of the reel of the present invention, including the outer casing, inner spool, central shaft, and the hollow handle, are all made from any lightweight, durable plastic material presently known. However, it is preferred that the material used for the reel is a polycarbonate plastic, particularly the polycarbonate known under the trade name "Lexan". This material is particularly suitable for use in the reel in that it has good impact resistance, is light and durable, and is inexpensive as well. Preferably, the plastic component pieces of the reel are made through a screw-injection molding process. In this procedure, a family mold containing molds for all the component parts of the reel can be prepared so that the reel can be made all at once. After the parts are prepared in this manner, assembly is quick and easy, and the entire process can be carried out simply an inexpensively.

In operation, a hydrographer will take the tagline reel loaded with up to around 600 feet of tagline to the bank of river or stream which is not too deep to wade across. The tagline itself can be a steel cord with pressed brass beads, or a tagline made of Kevlar fibers, as disclosed in a co-pending application. When it is desired to take a width measurement of the stream, the hydrographer positions the reel at a suitable spot on the river bank, and stations the reel by putting a support rod through the hollow handle attached to the casing. After the proper position of the support rod is attained, the rod is locked in place by tightening the wing nut on the hollow handle. At this point, the hydrographer sets a particular tension on the tagline using the drag assembly connected to the shaft, then pulls the tagline out and wades the river. When the tagline has been stretched across the river, a reading of total width of the stream is made, and the tagline can be fixed on the opposite river bank so that the hydrographer can make depth and flow velocity readings at various points along the river's width. If desired, the hydrographer can apply the spool locking means to maintain the tagline in stretched position across the stream while other measurements are made. When the stream gauging is completed, the spool locking pin is released, or the drag assembly tension is removed, and the hydrographer can easily rewind the tagline. The tagline reel of the present invention can thus be used to make safe, convenient, and accurate measurements of stream width.

What is claimed is:

1. A lightweight reel for retaining and dispensing a tagline used in the width measurement of wadable streams or rivers comprising:

an outer plastic casing;

a hollow elongated plastic handle spaced from said outer plastic casing to provide a finger gripping region and connected to said casing capable of retaining a support rod or other means for stationing said reel on the bank of a stream or river, said hollow handle including a locking means for securing said support rod or other stationing means in place inside said hollow handle;

a rotatable inner plastic spool disposed inside of said outer casing capable of receiving said tagline;

spool locking means capable of preventing rotation of said inner spool;

a central plastic shaft running through he center of said inner spool and said outer casing, said shaft connected to said inner spool so that said inner spool is rotated when said shaft is rotated;

crank means connected to said central shaft capable of rotating said shaft and said inner spool so as to wind or unwind the tagline around said inner spool; and a drag assembly capable of applying a variable amount of tension to said inner spool in order to retard the rotation of said inner spool, said drag assembly comprising an outer plate connected to said central shaft so that said outer plate rotates when said shaft is rotated, an inner plate connected to said outer casing so that said inner plate does not rotate in response to the rotation of said central shaft, and screw means connected to said central shaft which can be brought along said shaft towards said inner and outer plates so as to force the plates together and cause a variable amount of tension to be imparted to said inner spool which retards rotation of the spool, said tension increasing as said plates are brought closer together.

2. A lightweight reel according to claim 1 wherein the plastic pieces are comprised of a polycarbonate plastic.

3. A lightweight reel according to claim 1 wherein the hollow handle locking means comprises a wing nut and a notched bolt.

4. A lightweight reel according to claim 1 wherein the spool locking means comprises a locking pin and at least one hole in said inner spool positioned to receive said pin, said locking pin capable of extending into at least one of said holes in said inner spool so as to prevent rotation of said spool.

5. A lightweight reel according to claim 1 wherein the inner plate of said drag assembly comprises a stainless steel washer.

6. A lightweight reel according to claim 1 wherein the outer plate of said drag assembly comprises a notched brass washer.

7. A lightweight reel according to claim 1 wherein the spool capacity is at least around 600 feet.

* * * * *